(12) United States Patent
Murakami et al.

(10) Patent No.: US 6,524,207 B2
(45) Date of Patent: Feb. 25, 2003

(54) CONTROL METHOD OF INTER-AXLE DIFFERENTIAL AND INTER-AXLE DIFFERENTIAL APPARATUS

(75) Inventors: Takanobu Murakami, Yokohama (JP); Yukio Sugano, Shiraoka-machi (JP)

(73) Assignee: Komatsu Ltd., Tokyo (JP)

( * ) Notice: Subject to any disclaimer, the term of this patent is extended or adjusted under 35 U.S.C. 154(b) by 10 days.

(21) Appl. No.: 09/816,369

(22) Filed: Mar. 26, 2001

(65) Prior Publication Data

US 2001/0027144 A1 Oct. 4, 2001

(30) Foreign Application Priority Data

Mar. 29, 2000 (JP) .......................... 2000-091899

(51) Int. Cl.[7] .......................... F16H 48/06; F16H 48/70
(52) U.S. Cl. .......................... 475/86; 475/231; 475/249; 180/249
(58) Field of Search .......................... 475/84, 86, 231, 475/249; 180/248, 249

(56) References Cited

U.S. PATENT DOCUMENTS

| | | | | |
|---|---|---|---|---|
| 3,845,671 A | * | 11/1974 | Sharp et al. | 475/150 |
| 4,589,511 A | | 5/1986 | Leiber | 180/197 |
| 4,700,797 A | * | 10/1987 | Leiber | 180/249 |
| 4,765,434 A | * | 8/1988 | Kawamoto et al. | 180/249 |
| 4,937,750 A | * | 6/1990 | Gilliam | 180/249 |
| 4,947,325 A | * | 8/1990 | Iwata et al. | 180/233 |
| 5,247,443 A | * | 9/1993 | Gilliam | 180/249 |
| 5,301,769 A | | 4/1994 | Weiss | 180/249 |
| 5,738,604 A | * | 4/1998 | Dick | 180/249 |
| 6,038,506 A | * | 3/2000 | Diekhans et al. | 180/249 |

FOREIGN PATENT DOCUMENTS

| | | |
|---|---|---|
| EP | 0 278 588 A1 | 8/1988 |
| GB | 2 130 313 A | 5/1984 |
| WO | WO 92/00474 | 1/1992 |

OTHER PUBLICATIONS

Komatsu Ltd. Shop Manual, Sep. 7, 1985, Cover page, p. 01–5, and back cover page. "Proposed US Patent Application".

* cited by examiner

Primary Examiner—Jack Lavinder
Assistant Examiner—Robert A. Siconolfi
(74) Attorney, Agent, or Firm—Armstrong, Westerman & Hattori, LLP.

(57) ABSTRACT

An inter-axle differential capable of preventing a skid to achieve stable travel is provided. For this purpose, the inter-axle differential apparatus includes an inter-axle differential (13), an inter-axle differential lock (21), at least one rotation detector of a first rotation detector (27) for detecting rotational frequency of a transmission output shaft (24), a second rotation detector (28) for detecting rotational frequency of a front output shaft (25) of the inter-axle differential, and a third rotation detector (29) for detecting rotational frequency of a rear output shaft (26) of the inter-axle differential, and a controller (20) for detecting a sign of a skid occurring to driving wheels (2, 4) based on at least any one of the rotational frequency detected by the rotational detector and a rate of change with time of the detected rotational frequency and for outputting a differential lock signal to the inter-axle differential lock.

2 Claims, 4 Drawing Sheets

CONTROL METHOD OF INTER-AXLE DIFFERENTIAL AND INTER-AXLE DIFFERENTIAL APPARATUS

TECHNICAL FIELD

The present invention relates to an inter-axle differential of a vehicle and an inter-axle differential lock for locking the same.

BACKGROUND ART

A multiple-axle-driving vehicle, which is a mechanical type and drives a plurality of axles of front and rear wheels and the like, such as an articulated dump truck is conventionally known, and FIG. 1 is a side view thereof. In FIG. 1, output power of an engine 10 is transmitted dividedly to a front differential 15 and rear differentials 16 and 18 via a torque converter 14 and a transmission 11 by a transfer device 12.

The transfer device 12 is provided with an inter-axle differential 13 being a differential device for distributing the output power of the engine 10 to front wheels 2 and rear wheels 4 at a predetermined ratio. The inter-axle differential 13 gives a rotation difference between the front and rear wheels 2 and 4 according to a traveling distance of tires to absorb the rotation difference between the front wheels 2 and the rear wheels 4 when different loads are on the front wheels 2 and the rear wheels 4, for example, during turning, and has a function of making the vehicle travel smoothly.

However, there exist the following disadvantages in travel of the conventional articulated dump truck.

For example, when the dump truck goes uphill with a load thereon, a rear portion of the vehicle body drops while a front portion is raised. As a result, the load ratio of the front and rear wheels 2 and 4 is shifted toward the rear wheels 4. In this situation, if the road surface is soft, or has uneven spots, the front wheels 2 sometimes skid. However, since the inter-axle differential 13 compulsorily distributes torque to the front and rear wheels 2 an 4 at a specified ratio, the torque of the specified ratio out of the output power of the engine 10 is always transmitted to the front wheel 2 in the state in which the inter-axle differential 13 works. For this reason, when the front wheels 2 skid, rotation of the front wheels 2 under lighter load increases more and more to make the front wheels 2 idle.

Further, due to the inter-axle differential 13, the driving force of the entire vehicle depends on the smaller one of the torque transmitted to the road surface from the front wheels 2 and the torque transmitted to the road surface from the rear wheels 4. For this reason, when the front wheels 2 skid, acceleration of the vehicle decreases, and in some cases, the rear wheels 4 stop while only the front wheels 2 vigorously idle, whereby the vehicle stops. Further, when a squat phenomenon, in which the front wheels 2 are raised due to loss of torque as described above, ceases and subsequently the front wheels 2 land on the ground and recover ground contact pressure, a squat is caused by the driving force once again. As a result of the repetition of grip and skid of the front wheels as described above, the vehicle hardly advances, and pitching occurs sometimes, which makes the traveling difficult.

The disadvantages as described above also arise when the dump truck goes downhill in reverse, for example, with a retarder brake being applied. In this situation, load is shifted toward the rear wheels 4 due to brake torque of the retarder brake, and the front wheels 2 of the vehicle are raised, skid, and idle.

SUMMARY OF THE INVENTION

The present invention is made in view of the aforementioned disadvantages, and its object is to provide an inter-axle differential capable of preventing a skid to achieve stable travel even in the situation in which load is unevenly distributed.

In order to attain the above object, a control method of the inter-axle differential of the present invention is a control method of an inter-axle differential for distributing torque to front and rear driving wheels at a predetermined ratio, and includes the step of:

monitoring a skid occurring to the driving wheels, and locking the inter-axle differential when a sign of a skid occurring to the driving wheels appears.

As described above, for example, when the vehicle goes uphill with a load carried thereon and when the vehicle reverses downhill with the brake being applied, very large load is exerted on the rear wheels, and thus the front wheels easily skid. Accordingly, by monitoring a skid occurring to the front wheels and taking countermeasures against the skid, for example, stable travel can be achieved.

If a skid occurs, the inter-axle differential is locked and thereby the front wheels and the rear wheels are directly connected. As a result, the rotational frequencies of the front and rear wheels become a predetermined constant rotational frequency irrespective of load. Consequently, it does not happen that the rotational frequency of the front wheels becomes higher and higher though the front wheels are idling, thus increasing the possibility of the front wheels recovering from the skid. Further, since torque is also transmitted to the rear wheels, the vehicle can continue to travel owing to the gripping force. As described above, a skid can be surely prevented, pitching and stopping of the vehicle body can be prevented, and stable travel can be achieved.

An inter-axle differential apparatus of the present invention is an inter-axle differential apparatus including an inter-axle differential for distributing torque to front and rear driving wheels at a predetermined ratio, an inter-axle differential lock for locking the inter-axle differential, and a controller for outputting a differential locking signal to the inter axle-differential lock and locking the inter-axle differential, includes at least any one of the following rotation detectors: a first rotation detector for detecting rotational frequency of a transmission output shaft; a second rotation detector for detecting rotational frequency of a front output shaft of the inter-axle differential; and a third rotation detector for detecting rotational frequency of a rear output shaft of the inter-axle differential, and the controller detects a sign of a skid occurring to the driving wheels based on at least any one of the following:

rotational frequency detected by at least any one of the rotation detectors; and a rate of change with time of the detected rotational frequency, and outputs the differential locking signal when finding the sign of a skid.

For example, if a skid occurs to the front wheels with load being shifted to the rear wheels, the front wheels repeatedly rise and land on the ground, thus cyclically increasing and decreasing the rotational frequency of the front wheels. Accordingly, by detecting the rotational frequency of the front output shaft of the inter-axle differential, and the amplitude and cycle of the shaft rotation acceleration being the rate of change with time thereof, a sign of a skid can be accurately detected. Further, since the inter-axle differential functions so as to increase and decrease the rotational frequency of the rear output shaft inversely with an increase and decrease in the rotational frequency of the front output shaft, a sign of a skid can be accurately detected by detecting the shaft rotation acceleration being the rate of change with time thereof.

Furthermore, when a skid occurs and the wheels vigorously idle, the total transmission torque to a road surface decreases. As a result, the engine load is decreased, and especially during full-throttle acceleration, the rotation of the engine abruptly becomes high, thereby increasing the rotational frequency of the transmission output shaft. On the other hand, for example, when the axle of the front wheels which are skidding recovers grip as a result of the wheels landing on the ground, engine load torque increases, thus reducing the engine speed. Accordingly, by detecting the rotational frequency of the transmission output shaft and its shaft rotation acceleration, a sign of a skid can be accurately detected.

As described above, by detecting at least any one of the rotational frequencies, a sigh of a skid can be detected. Consequently, the inter-axle differential is locked based on the above, thereby making it possible to surely prevent a skid and recover the normal operation. Since an ordinary vehicle is always equipped with a rotational frequency detector for detecting the rotational frequency of the transmission output shaft, it is not necessary to provide another detector, and a slip can be detected easily.

BEST MODE FOR CARRYING OUT THE INVENTION

A preferred embodiment according to the present invention will be explained in detail below with reference to the drawings.

Figure 1:
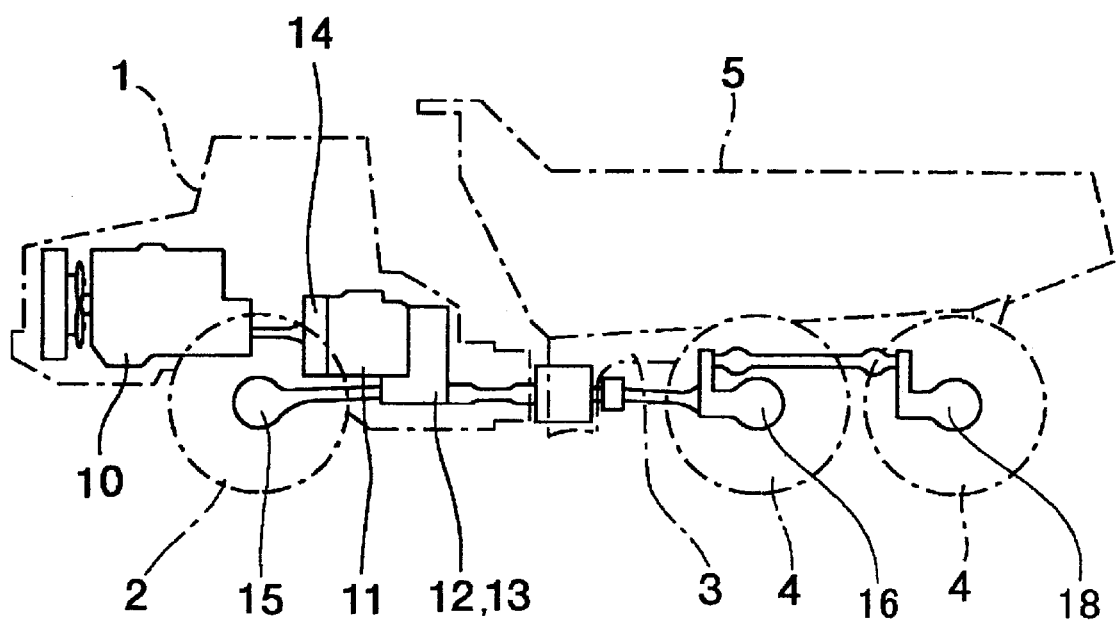
FIG. 1 is a side view of a conventional vehicle to which an inter-axle differential apparatus according to the present invention is applied.
Figure 2:
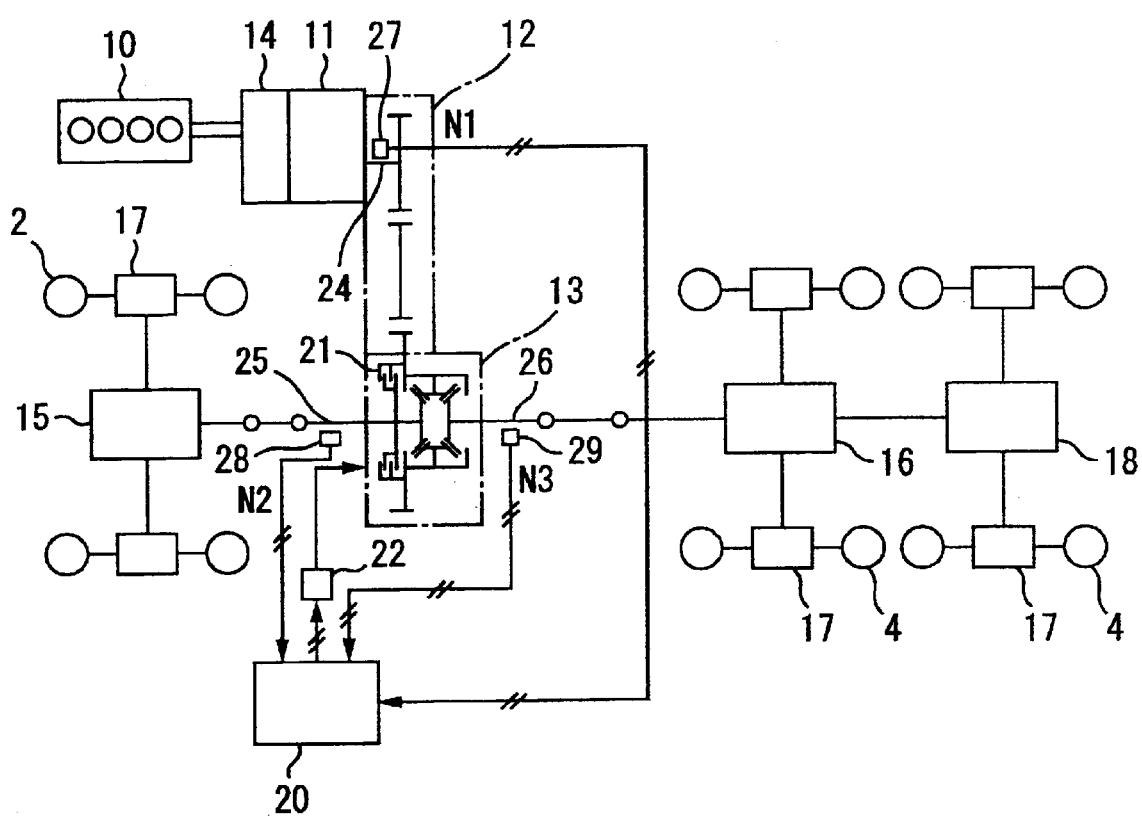
FIG. 2 is a system block diagram of a vehicle according to an embodiment of the present invention.

FIG. 1 shows a side view of a mechanical multiple-axle driving vehicle to which an inter-axle differential apparatus according to the present embodiment is applied, and an articulated dump truck is shown as an example. FIG. 2 is a system block diagram thereof.

In FIGS. 1 and 2, a front vehicle body 1 having front wheels 2 and a rear vehicle body 3 having rear wheels 4 and 4 are coupled by means of a coupling device (not shown). The front vehicle body 1 is provided with a driver's cab, and the rear vehicle body 3 is equipped with a dump body 5 for carrying earth and sand or the like.

The articulated dump truck has an all-wheel-drive system for driving all the wheels 2 and 4. An output shaft of an engine 10 is connected to an input shaft of a torque converter 14, while an output shaft of the torque converter 14 is connected to an input shaft of a transmission 11. A transmission output shaft 24 is connected to a transfer device 12 for transferring output power dividedly to the front wheels 2 and the rear wheels 4.

The transfer device 12 is provided with an inter-axle differential 13 being a differential device to distribute input power between the front wheels 2 and rear wheels 4 and to absorb difference in rotation between the front wheels 2 and the rear wheels 4. The inter-axle differential 13 is provided with an inter-axle differential lock 21 (hereinafter called the differential lock 21) for locking the inter-axle differential 13 to keep it in a non-operating state to directly connect a front output shaft 25 and a rear output shaft 26 of the inter-axle differential 13.

A differential lock signal is outputted from a controller 20 to an electromagnetic valve 22 electrically connected thereto and pressure oil is sent to the differential lock 21 from the electromagnetic valve 22, thereby a locking operation of the differential lock 21 is performed. When a differential lock releasing signal is outputted, the differential lock 21 is released, whereby the inter-axle differential 13 is operated to distribute torque between the front and rear wheels 2 and 4 at a predetermined ratio.

A first to a third rotation detector 27, 28, and 29 for detecting respective rotational frequencies N1, N2, and N3 are disposed at the transmission output shaft 24, the front output shaft 25 and the rear output shaft 26 of the inter-axle differential 13. The first to the third rotation detectors 27, 28, and 29 are connected to the controller 20, and the controller 20 can detect the rotational frequencies N1, N2, and N3 of the respective shafts 24, 25, and 26 by computation based on the respective output signals. The controller 20 can calculate shaft rotation acceleration of each of the shafts 24, 25, and 26 based on these rotational frequencies N1, N2, and N3 of the respective shafts.

The front output shaft 25 of the inter-axle differential 13 is connected to a front differential 15, which is connected to the front wheels via a final reduction gear 17. The rear output shaft 26 is connected to a front side rear differential 16, which is connected to the rear wheels 4 via the final reduction gear 17. An output shaft of the front side rear differential 16 is connected to a rear side rear differential 18, which is connected to the rear wheel 4 via the final reduction gear 17.

An art of preventing the front wheels 2 from skidding and the vehicle body from pitching by controlling the aforementioned differential lock 21 in the dump truck as described above will be explained hereinafter.

Figure 3:
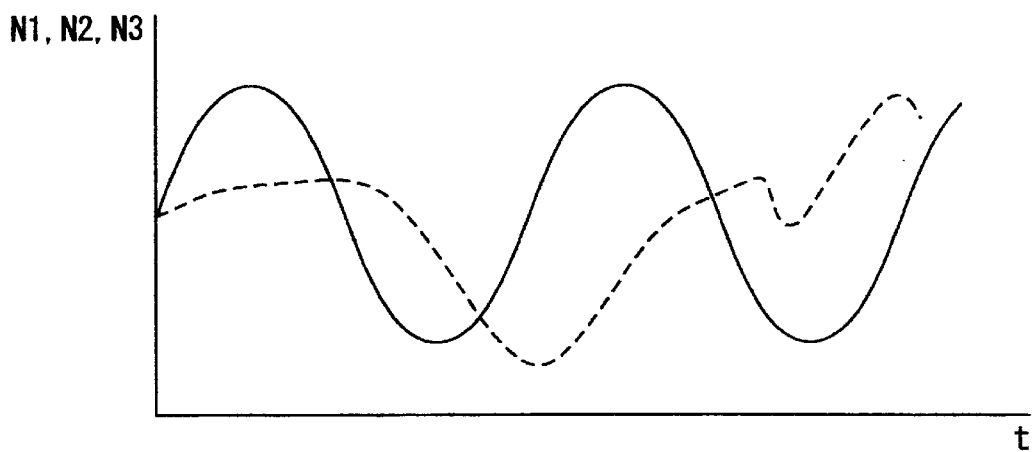
FIG. 3 is a time chart of rotational frequency according to the embodiment.

FIG. 3 is a time chart in which the horizontal axis represents a time t and the vertical axis represents any one of the rotational frequencies N1, N2, and N3. With reference to FIG. 3, a control procedure will be explained in detail. As shown by the broken line in FIG. 3, the rotational frequencies N1, N2, and N3 increase or decrease at random, for example, when the vehicle is accelerated or decelerated during a normal operation. In contrast to the above, when the vehicle goes uphill with a load carried thereon, if the front wheels 2 skid, the front wheels 2 repeatedly rise and land on the ground in an almost constant cycle. As a result, when they rise, idle running increases in intensity and the rotational frequency N2 of the front wheels 2 increases, while when they land on the ground, the rotational frequency N2 decreases due to frictional force against a road surface. Consequently, as shown by the solid line in FIG. 3, the rotational frequency N2 increases and decreases in an almost constant cycle.

Accordingly, by detecting the amplitude and cycle of the rotational frequency N2 of the front output shaft 25 of the inter-axle differential 13 connected to the front wheels 2, a sign of a skid can be detected. The inter-axle differential 13 in this situation increases and decreases the rotational frequency N3 of the rear output shaft 26 inversely with the rotational frequency N2 following a change in the rotational frequency N2 of the front output shaft 25. Specifically, since the rotational frequency N3 of the rear output shaft increases and decreases inversely with an increase and decrease of the rotational frequency N2 of the front output shaft 25, detecting this makes it possible to accurately detect a sign of a skid.

Further, when a skid occurs and the front wheels 2 idle vigorously, the total torque transmitted to the road surface decreases. As a result, engine load decreases, and therefore engine speed abruptly increases especially during full-throttle acceleration, and it increases to an almost high idle point.

When the axle of the skidding front wheels 2 recovers grip as a result of the front wheels 2 land on the ground, engine load torque increases, whereby the engine speed reduces. Specifically, since the engine speed repeatedly increases and decreases as the result that the front wheels 2 repeatedly rise and land on the ground, by detecting this, a sign of a skid can be accurately detected.

In addition, in an ordinary vehicle, a first rotation detector 27 for detecting the rotational frequency N1 of the transmission output shaft 24 is always equipped, it is not necessary to provide the second and the third detectors 28 and 29 additionally, which makes it possible to detect a skid with a simple structure. In this situation, in an actual control, it is preferable to calculate shaft rotation accelerations dN1/dt, dN2/dt, and dN3/dt being rates of change with time of the rotation frequencies N1, N2, and N3, instead of the rotational frequencies N1, N2, and N3, and to detect a skid based on an amplitude V and a cycle T thereof.

Figure 4:
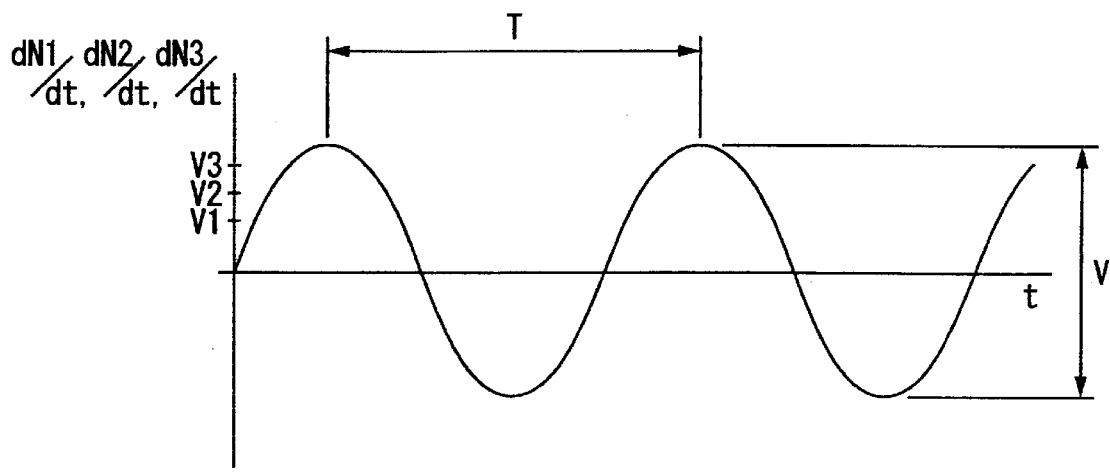
FIG. 4 is a time chart of shaft rotation acceleration according to the embodiment.

FIG. 4 is a time chart in which the horizontal axis represents the time t, and the vertical axis represents any one of the shaft rotation accelerations dN1/dt, dN2/dt, and dN3/dt. When the rotational frequencies N1, N2, and N3 increase and decrease in a form of sine wave during a skid as shown in FIG. 3, the shaft rotation accelerations dN1/dt, dN2/dt, and dN3/dt being the rates of change with time thereof also oscillate in the form of sine wave. Accordingly, it is possible to detect a skid accurately by detecting the amplitude V and the cycle T based on the above. Further, by calculating the rate of change with time, off-set components of the rotational frequencies N1, N2, and N3 are eliminated, and the shaft rotation accelerations dN1/dt, dN2/dt, and dN3/dt vertically oscillate with zero as the center, thus facilitating detection of the amplitude V and the cycle T and simplifying the control.

Further, for example, when constant acceleration and deceleration are conducted, it can be expressed that the rotational frequencies N1, N2, and N3=V sin($2\pi t/T$)+Bt+C where B and C are constants respectively. Accordingly, the rotational frequencies N1, N2, and N3 oscillate, having "Bt" being a gradient component, thus making it difficult to accurately detect the amplitude V and the cycle V. On the other hand, the shaft rotation accelerations dN1/dt, dN2/dt, and dN3/dt are V cos($2\pi t/T$)+B, and only an off-set component is left while the gradient component is eliminated, thus making it easy to detect the amplitude V and the cycle T and simplifing the control.

Figure 5:
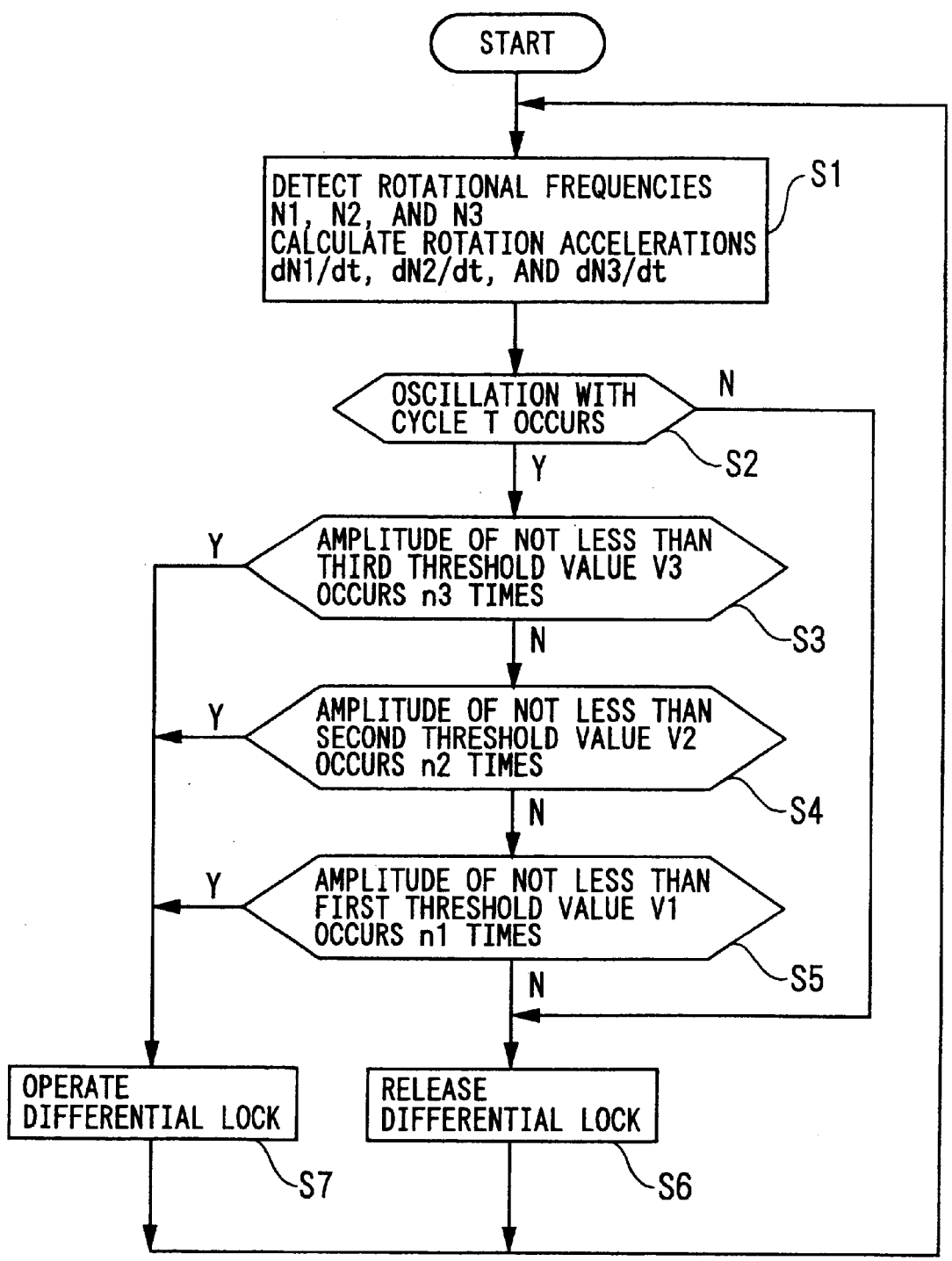
FIG. 5 is a flowchart of a control procedure according to the embodiment.

FIG. 5 shows a flowchart of a control procedure. Initially, the controller 20 detects any one of the rotational frequencies N1, N2, and N3 of the transmission output shaft 24, and the front output shaft 25 and the rear output shaft 26 of the inter-axle differential 13 for a predetermined period of time, and the shaft rotation accelerations dN1/dt, dN2/dt, and dN3/dt being the time rates of change thereof are calculated (step S1).

Subsequently, it is determined whether or not the oscillation of the shaft rotation accelerations dN1/dt, dN2/dt, and dN3/dt occurs in the predetermined cycle T (step S2). If it is "no", it is judged that the front wheels 2 do not skid, and the differential lock 21 is released to allow the inter-axle differential 13 to function (step S6).

Specifically, when the front wheels 2 skid, the shaft rotation accelerations dN1/dt, dN2/dt, and dN3/dt oscillate in the predetermined cycle T as described above. On the other hand, for example, when abrupt acceleration or hard braking occurs, they do not oscillate in the cycle T though the amplitude V is large. Accordingly, by setting the cycle T to be one of the referee conditions for a skid, it becomes possible to surely determine the occurrence of a skid. The range of the cycle T for determination can be previously set according to the weight of the vehicle body and load, the strength of a suspension, or the like. Further, the range of the cycle T for determination may be set during the control.

When the cycle T is within a predetermined range in step S2, the amplitude V is initially compared with a predetermined third threshold value V3 (step S3). If the situation in which the amplitude V is larger than the third threshold value V3 occurs n3 times or more in a predetermined period of time, it is determined that the front wheels 2 skid. The differential lock 21 is then operated to directly connect the inter-axle differential 13 (step S7).

Further, in step S3, the situation in which the amplitude V is larger than the third threshold value V3 does not occur n3 times or more, the amplitude V is compared with a predetermined second threshold value V2 (step S4). If the situation in which the amplitude V is larger than the second threshold value V2 occurs n2 times or more in a predetermined period of time, it is determined that the front wheels 2 skid, and the differential lock 21 is then operated to directly connect the inter-axle differential 13 (step S7).

In step S4, the situation in which the amplitude V is larger than the second threshold value V2 does not occur n2 times or more, the amplitude V is compared with a predetermined first threshold value V1 (step S5). If the situation in which the amplitude V is larger than the first threshold value V1 occurs n1 times or more in a predetermined period of time, it is determined that the front wheels 2 skid, and the differential lock 21 is then operated to directly connect the inter-axle differential 13 (step S7).

If the situation in which the amplitude V is larger than the first threshold value V1 does not occur n1 times or more in step S5, it is judged that the front wheel 2 does not skid, and the differential lock 21 is released to allow the inter-axle differential 13 to function (step S6). Subsequently, the command are given to return to step Si from step S6 and S7 respectively.

In the above flowchart, the relationship between each threshold V1, V2 and V3 is V1<V2<V3. Further, n1>n2>n3. Though it is mentioned that only any one of the shaft rotation accelerations dN1/dt, dN2/dt, dN3/dt is detected in the explanation, it is not restrictive, and it may be suitable to determine occurrence of a skid based on a plurality of rotation accelerations.

Specifically, when the shaft rotation accelerations dN1/dt, dN2/dt, dN3/dt oscillate in each cycle T and the amplitude V of the oscillation exceeds a predetermined threshold a predetermined times or more in a predetermined period of time, it is determined that the front wheels 2 skid, or almost skid. Subsequently, it is considered that a skid occurs, and the differential lock 21 is operated to directly connect the inter-axle differential 13. By directly connecting the inter-axle differential 13, the rotational frequencies of the front and rear wheels 2 and 4 are made to be predetermined constant rotational frequencies respectively irrespective of load. Specifically, even if the front wheels 2 skid and idle, the rear wheels 4 transmit the drive force to a road surface, thus preventing increase in skid of the front wheels 2, loss of speed, occurrence of pitching due to rebound of the front wheels 2, and making it possible to travel with stability. When the front wheels 2 recover gripping force and the vehicle returns into a normal traveling state, the differential lock 21 is released. By releasing the differential lock 21, the difference in load between the front wheel 2 and the rear wheel 4 during turning can be absorbed by the differential, which makes it possible to keep favorable travel.

Further, according to the present embodiment, the cycles T of the oscillation of the shaft rotation accelerations dN1/dt, dN2/dt, and dN3/dt are detected, and according to whether or not the cycle T is within a predetermined range, it is determined whether or not a skid occurs. The oscillation of the shaft rotation accelerations dN1/dt, dN2/d2, and dN3/dt in the case of a skid occurring becomes regular oscillation having the cycle T as described above, and therefore it is possible to surely detect a skid based on the cycle T of the oscillation. Thereby, it is possible to obtain comfortable travel with the inter-axle differential 13 functioning during normal travel and operate the differential lock 21 only when necessary to thereby prevent the phenomena which become obstacles to the operation, such as pitching and stopping of the vehicle.

In the explanation of the present embodiment, occurrence of a skid is detected based on the shaft rotation accelerations dN1/dt, dN2/dt, and dN3/dt of the transmission output shaft 24, and the front output shaft 25 and the rear output shaft 26 of the inter-axle differential 13, and lock/release of the differential lock 21 is decided, but this is not restrictive. For example, since the rotational frequencies N1, N2, and N3 show almost the same behavior as described above, a skid may be detected based on the rotational frequencies N1, N2, and N3 to perform the control. Further, it may be suitable to detect a skid based on the rotational frequency or the oscillation of the rate of change with time of any of the shafts of front and rear propeller shaft, the engine, the transmission, or the like, which are mechanically connected to the front and rear wheels 2 and 4, and thereby perform the control. Furthermore, it may be suitable to set a vibration meter in the vehicle body and detect a skid based on the fact that the vibration becomes regular, and thereby perform the control.

Further, in the explanation of the present invention, only a skid of the front wheels 2 is explained, but this is not restrictive, and as for a skid of the rear wheels 4, it is possible to prevent the skid by locking the inter-axle differential 13.

In the present embodiment, the explanation is made about the articulated dump truck, but this is effective in any vehicles that drive a plurality of axles. Further, this is also effective in any vehicle having differential locks at left and right differentials, and in this case, it is suitable to detect one of left and right wheels skidding based on the input rotational frequencies of the differentials and to lock the differential lock.

What is claimed is:

1. An inter-axle differential apparatus including an inter-axle differential for distributing torque to front and rear driving wheels at a predetermined ratio, an inter-axle differential lock for locking said inter-axle differential, and a controller for outputting a differential lock signal to said inter-axle differential lock and locking said inter-axle differential, said inter-axle differential apparatus comprising:
at least any one of the following rotation detectors: a first rotation detector for detecting rotational frequency of a transmission output shaft; a second rotation detector for detecting rotational frequency of a front output shaft of said inter-axle differential; and a third rotation detector for detecting rotational frequency of a rear output shaft of said inter-axle differential, wherein said controller detects a sign of a skid occurring to said driving wheels based on at least any one of the following: amplitude and cycle of said rotational frequency detected by at least any one of said rotation detectors; and a rate of change with time of said detected rotational frequency, and outputs the differential lock signal when finding the sign of a skid.

2. A control method of an inter-axle differential for distributing torque to front and rear driving wheels at a predetermined ratio, comprising the steps of:

detecting rotational frequency of at least any one of a transmission output shaft, a front output shaft of said inter-axle differential, and a rear output shaft of said inter-axle differential;

calculating shaft rotation acceleration, which is a rate of change with time, of at least one of said detected rotational frequency;

determining whether or not vibration of at least one of said detected shaft rotation acceleration occurs in a predetermined cycle;

comparing an amplitude of at least one of said shaft rotation acceleration and a predetermined threshold value, when it is determined that said vibration occurs in said predetermined cycle; and determining that at least one of said driving wheels skids and locking said inter-axle differential, when a state, in which said vibration is larger than said predetermined threshold value, occurs predetermined times or more in a predetermined time.

* * * * *